Aug. 21, 1934.  E. H. HAUX  1,970,748
METHOD OF CALKING LAMINATED GLASS
Filed May 10, 1933

INVENTOR
ELMER H. HAUX.
BY Bradley & Bee
ATTORNEYS

Patented Aug. 21, 1934

1,970,748

UNITED STATES PATENT OFFICE 1,970,748

METHOD OF CALKING LAMINATED GLASS

Elmer H. Haux, Tarentum, Pa., assignor to Duplate Corporation, a corporation of Delaware Application May 10, 1933, Serial No. 670,269

2 Claims. (Cl. 18—3.5)

The invention relates to calking or edge sealing plates of laminated glass. Such plates consist ordinarily of two sheets of glass cemented to the opposite sides of a sheet of reinforcing, such as cellulose nitrate or cellulose acetate. In order to protect the edges of the plate against the entrance of moisture and edge separation resulting therefrom, it is the practice to groove out the reinforcing by a cutting tool, or by the use of acid to a depth of about one-sixteenth of an inch, such groove then being filled with a more or less plastic sealing material, such as pitch, which may or may not subsequently harden, depending on the particular material used. The application of the calking material may be accomplished in various ways, but is preferably accomplished by the use of the apparatus shown in the patent to T. H. Wright, No. 1,916,748 issued July 4, 1933, in which a calking wheel carrying the calking paste is used, and the glass sheet to be sealed is pressed against the edge of the wheel to fill the groove. In the use of this apparatus, or in the use of any other with which I am familiar, some difficulty is involved in forcing the paste into the groove, and the plate is always somewhat smeared with the paste and involves considerable labor in cleaning. The object of the present invention is to treat the plate so as to reduce the difficulty in getting the paste into the groove to be sealed, and to facilitate the cleaning of the calking material from the glass after the sealing operation.

Figure 1:
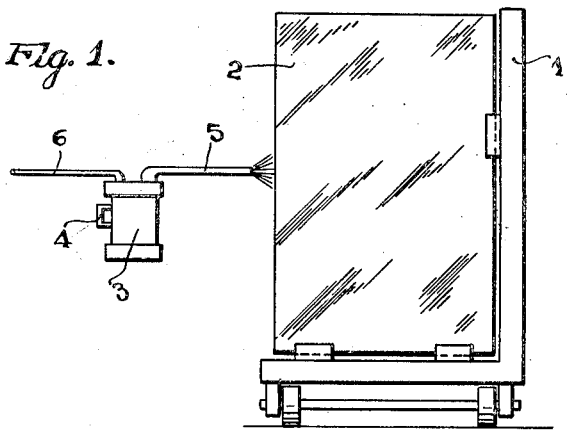

Briefly stated, the result is accomplished by applying oil or grease to the edges of the plates preliminary to calking so that such oil or grease penetrates the groove and covers the sides of the sheet adjacent to the edges. When so treated, the calking material is forced into the groove with little effort, and any of the material which smears the sides of the plate is very easily removed. The apparatus preferably employed is shown in the accompanying drawing, wherein:

Figure 1 is a side elevation illustrating the method of applying the oil. And Fig. 2 is a perspective view of the means employed for calking the plates.

Referring to Fig. 1, 1 is a rack adapted to carry a series of laminated plates 2 whose edges are grooved preliminary to sealing, and 3 is a container carrying the oil which is to be used in treating the edges of the plates. The container is provided with a suitable handle 4 and a spray nozzle 5 for atomizing the oil. A flexible tube 6 leads to a source of compressed air. The oil used is preferably a light mineral oil, but other oils may be used, such as linseed oil or China-wood oil. Grease or other lubricant may also be used by wiping it on instead of spraying. When the oil is thus sprayed or wiped onto the edge portion of the sheet, a certain amount spreads over the side surfaces making the plates easy to clean after the sealing operation.

Figure 2:
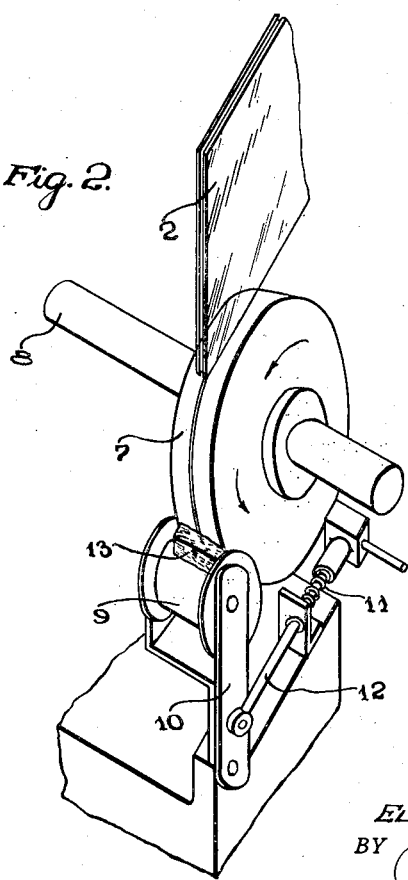

The calking apparatus is preferably of the type shown in Fig. 2, although the step of oiling or greasing as above described has similar utility with other forms of calking apparatus. As here shown, 7 is a disc or wheel of material, such as felt, rubber, or leather, which will hold the calking paste, such wheel being mounted on the arm 10, and pulled toward the wheel by the spring 11 and arm 12. The calking paste 13 is placed in the pocket between the roller and wheel. In using the apparatus, the laminated plate 2 is held against the wheel by the operator, as indicated in the drawing. The plate is pressed against the wheel sufficiently to cause the paste to penetrate the groove, and fill it at the point of contact between the plate and the wheel, and the operator moves the plate gradually along the wheel until the groove at one edge of the plate is filled from end to end, after which the other edges are similarly treated. Due to the preliminary step of applying oil or lubricant to the groove in the plate, the operator can work much faster than would otherwise be the case, the average time for calking when the oil is used being about one-half that required in the previous practice without the oil. There is a similar saving in labor in the final cleaning step in which all traces of calking material must be removed from the edges and sides of the plate.

What I claim is:

1. A process of treating the grooved edge of a laminated plate which consists in atomizing a lubricant and directing such atomizing lubricant against the grooved edge of the plate and the side surfaces of the plate adjacent to said edge, forcing calking paste into the groove and finally cleaning said edge and side surfaces.

2. A process of treating grooved laminated plates, which consists in stacking a plurality of such plates in an upright position with their side faces in parallel, atomizing a lubricant, directing such atomized lubricant against the grooved edges of the plates and into the spaces between their side surfaces, forcing calking paste into the grooves at the edges of the plates, and finally cleaning the side surfaces of the plates.

ELMER H. HAUX.